(12) United States Patent
Shah

(10) Patent No.: US 11,825,329 B1
(45) Date of Patent: Nov. 21, 2023

(54) LOCATION-BASED RESOURCE ALLOCATION IN 5G NETWORKS

(71) Applicant: T-Mobile USA, Inc., Bellevue, WA (US)

(72) Inventor: Darshan Shah, Maple Valley, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 350 days.

(21) Appl. No.: 17/357,837

(22) Filed: Jun. 24, 2021

(51) Int. Cl.
| | | |
|---|---|---|
| *H04W 28/02* | (2009.01) | |
| *H04W 64/00* | (2009.01) | |
| *H04B 7/06* | (2006.01) | |
| *H04W 4/021* | (2018.01) | |
| *H04W 72/044* | (2023.01) | |
| *H04W 48/04* | (2009.01) | |
| *H04W 72/51* | (2023.01) | |

(52) U.S. Cl.
CPC ...... *H04W 28/0226* (2013.01); *H04B 7/0695* (2013.01); *H04W 4/021* (2013.01); *H04W 48/04* (2013.01); *H04W 64/003* (2013.01); *H04W 72/046* (2013.01); *H04W 72/51* (2023.01)

(58) Field of Classification Search
CPC ............. H04W 28/0226; H04W 72/51; H04W 4/021; H04W 48/04; H04W 64/003; H04W 72/046; H04W 12/00503; H04W 12/63; H04W 28/0804; H04W 40/20; H04B 7/0695
See application file for complete search history.

(56) References Cited

U.S. PATENT DOCUMENTS

| | | | | |
|---|---|---|---|---|
| 10,764,743 | B1* | 9/2020 | Martell | H04W 48/04 |
| 2017/0332306 | A1* | 11/2017 | Hillary | H04W 12/64 |
| 2019/0007417 | A1* | 1/2019 | Schenk | H04W 48/04 |

\* cited by examiner

*Primary Examiner* — Gary Mui
*Assistant Examiner* — Stephen N Steiner
(74) *Attorney, Agent, or Firm* — Lee & Hayes, P.C.

(57) ABSTRACT

Techniques for configuring a network system that includes a cellular network and a Wi-Fi network to support location-based resource allocation are discussed herein. To cover regions with weak cellular signal and/or with densely packed devices (e.g., a stadium during a football game), a network may use both cellular and Wi-Fi networks to provide coverage. In some examples, the system may configure a base station and a user device to enable automatic authentication of the user device to access a new Wi-Fi network. In response to a service request from the user device, the system may determine whether the Wi-Fi network can handle the service or switch a serving connection. The system may also determine whether the Wi-Fi network includes location-based applications that should be rendered at the user device.

20 Claims, 7 Drawing Sheets

500

RECEIVE NETWORK RESOURCE DATA FOR ONE OR MORE WI-FI NETWORKS ASSOCIATED WITH A SERVICE PROVIDER, THE NETWORK RESOURCE DATA INCLUDING GEOFENCE DATA AND ACCESS POINT DATA ASSOCIATED A WI-FI NETWORK THE OF ONE OR MORE WI-FI NETWORKS
502

CONFIGURE A SUBSCRIBER IDENTITY MODULE (SIM) CARD WITH AN ENHANCED SIM PROFILE, THE ENHANCED SIM PROFILE INDICATING A USER DEVICE IS CONFIGURED TO SELF-AUTHENTICATE FOR LOCATION-BASED SERVICES OF THE SERVICE PROVIDER
504

RECEIVE, FROM THE USER DEVICE, DATA INCLUDING THE ENHANCED SIM PROFILE AND A BEAM NUMBER OF A BASE STATION IN CONNECTION WITH THE USER DEVICE
506

DETERMINE, BASED AT LEAST IN PART ON THE BEAM NUMBER, GEOLOCATION INFORMATION ASSOCIATED WITH A LOCATION OF THE USER DEVICE
508

DETERMINE, BASED AT LEAST IN PART ON THE GEOLOCATION INFORMATION AND THE NETWORK RESOURCE DATA, THAT NETWORK RESOURCES ASSOCIATED WITH THE LOCATION INCLUDES A CELLULAR NETWORK AND THE WI-FI NETWORK
510

DETERMINE, BASED AT LEAST IN PART ON THE ENHANCED SIM PROFILE, TO AUTHENTICATE THE USER DEVICE TO ACCESS THE WI-FI NETWORK
512

```
┌─────────────────────────────────────────────────────────┐
│ RECEIVE, FROM A USER DEVICE, FIRST DATA INCLUDING AN    │
│ ENHANCED SUBSCRIBER IDENTITY MODULE (SIM) PROFILE AND   │
│ A BEAM NUMBER OF A BASE STATION IN CONNECTION WITH      │
│ THE USER DEVICE                                         │
│ 702                                                     │
└─────────────────────────────────────────────────────────┘
                             │
                             ▼
┌─────────────────────────────────────────────────────────┐
│ DETERMINE, BASED AT LEAST IN PART ON THE BEAM NUMBER,   │
│ GEOLOCATION INFORMATION ASSOCIATED WITH A LOCATION OF   │
│ THE USER DEVICE                                         │
│ 704                                                     │
└─────────────────────────────────────────────────────────┘
                             │
                             ▼
┌─────────────────────────────────────────────────────────┐
│ DETERMINE, BASED AT LEAST IN PART ON THE GEOLOCATION    │
│ INFORMATION AND THE ENHANCED SIM PROFILE, TO            │
│ AUTOMATICALLY AUTHENTICATE THE USER DEVICE TO USE A     │
│ WI-FI NETWORK                                           │
│ 706                                                     │
└─────────────────────────────────────────────────────────┘
                             │
                             ▼
┌─────────────────────────────────────────────────────────┐
│ DETERMINE, BASED AT LEAST IN PART ON THE GEOLOCATION    │
│ INFORMATION, A NETWORK SERVICE ASSOCIATED WITH THE      │
│ LOCATION, THE NETWORK SERVICE INCLUDING A               │
│ LOCATION-BASED APPLICATION                              │
│ 708                                                     │
└─────────────────────────────────────────────────────────┘
                             │
                             ▼
┌─────────────────────────────────────────────────────────┐
│ TRANSMIT, TO THE USER DEVICE VIA THE WI-FI NETWORK,     │
│ SECOND DATA ASSOCIATED WITH THE LOCATION-BASED          │
│ APPLICATION                                             │
│ 710                                                     │
└─────────────────────────────────────────────────────────┘
```

FIG. 7

LOCATION-BASED RESOURCE ALLOCATION IN 5G NETWORKS

BACKGROUND

Modern telecommunication systems include heterogeneous mixtures of second, third, fourth, and fifth generation (2G, 3G, 4G, 5G) cellular wireless access technologies, which may be cross-compatible and may operate collectively to provide communication services. Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies.

To provide infrastructure for wireless communication technologies, wireless nodes may be deployed to provide support for a particular type of network. These wireless nodes enable connectivity to support the infrastructure and systems for the next-generation networks.

BRIEF DESCRIPTION OF THE DRAWINGS

The detailed description is described with reference to the accompanying figures. In the figures, the left-most digit(s) of a reference number identifies the figure in which the reference number first appears. The use of the same reference numbers in different figures indicates similar or identical components or features.

FIG. 5 illustrates an example process for configuring a network to support location-based resource allocation, including automatic authentication for Wi-Fi network access.

FIG. 7 illustrates another example process for configuring a network to support automatic authentication for a location-based application.

DETAILED DESCRIPTION

Figure 1:
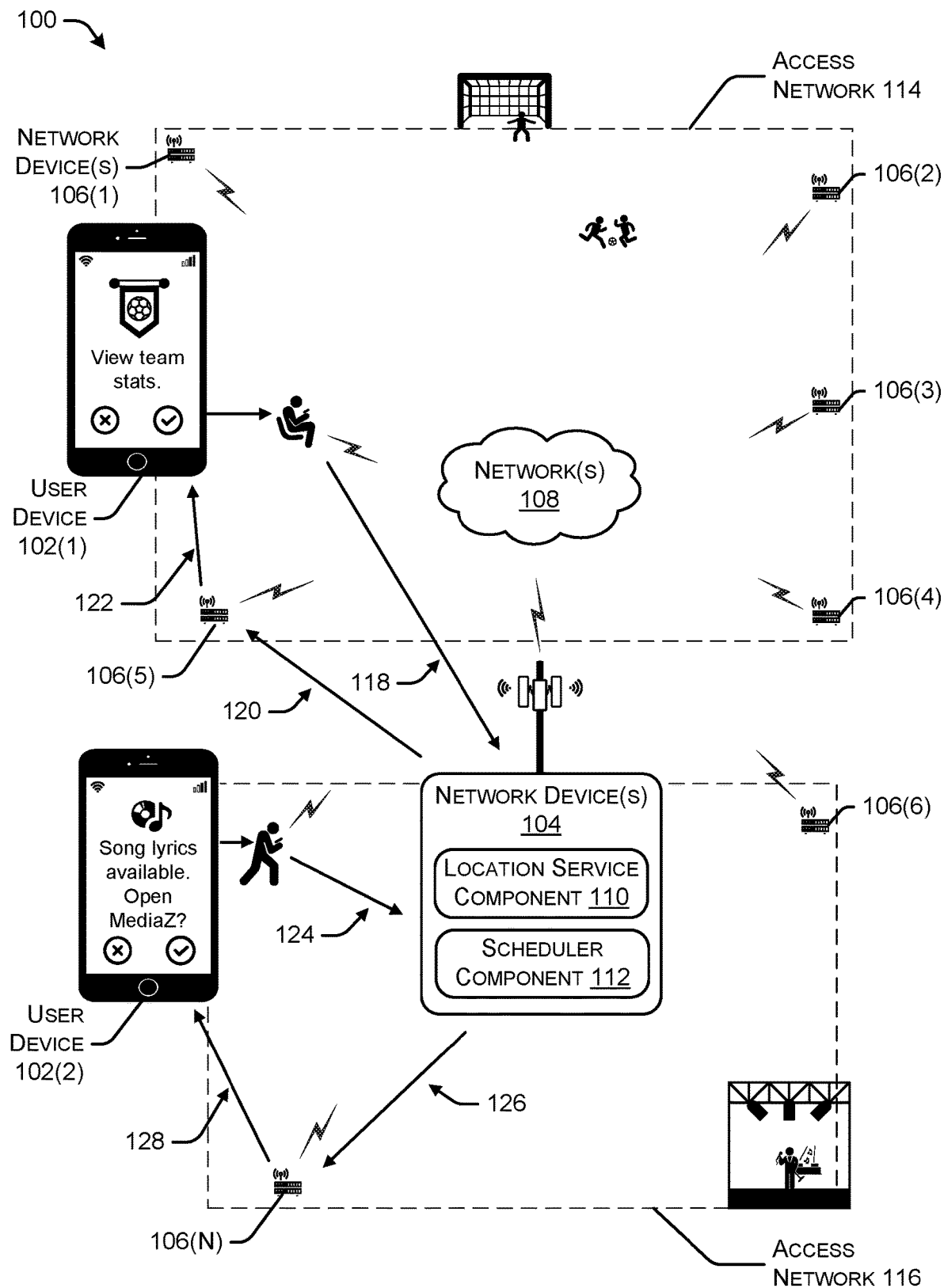
FIG. 1 illustrates an example system including network devices configured to support location-based resource allocation.

Techniques for configuring a network system with network devices that support location-based resource allocation for user devices are discussed herein. In a traditional cellular network, a user device may be automatically authenticated to access a cellular network with information stored on a subscriber identity module (SIM) card. The user device may need manual input to access an unknown Wi-Fi network with information entered by user input. In some examples, after the initial access to the unknown Wi-Fi network, the user device may remember the Wi-Fi network and may automatically sign onto the Wi-Fi network again when the user device is within signal range again. In some instances, in large stadiums, warehouses, or other similarly large structures, the user devices within the interior of these structures may be densely packed while sharing the same weak cellular signal ("weak signal region"). These structures may also be wired with wireless nodes to provide Wi-Fi coverage to substantially all of the structure. Accordingly, to provide network coverage for such a weak signal region, a service provider may partner with the Wi-Fi service provider to deploy a network including base stations and Wi-Fi access points that automatically authenticates the user device to access the Wi-Fi network and determine location-based resource allocation.

In some examples, the system may configure network devices and user devices to support location-based resource allocation. The system may configure a SIM card with an enhanced SIM profile to indicate that an associated user device is configured to automatically self-authenticate and/or enable location-based services associated with the service provider. The system may configure a network device on a base station to store network data for one or more Wi-Fi networks within the coverage area of the base station. The network data may include information for each Wi-Fi network, including network security information, access point locations, and/or a geofence for the Wi-Fi network. The geofence may be defined by: (1) a predetermined radius from a location of a wireless node and/or (2) corner coordinates defining geofence boundaries. In various examples, the system may receive data from a user device that has entered into the coverage area of the base station. The data may include SIM data and a beam number of the base station in connection with the user device. The SIM data may indicate an enhanced SIM profile. The system may determine, based on the SIM data, the user device is configured to use the location-based resources.

In various examples, the system may use the beam number to determine more precise geolocation information associated with the location of the user device. A user device may include a Global Positioning System (GPS) receiver to receive and report signal information received from GPS satellites in a traditional geolocation system. The traditional system relies on the global navigation satellite systems (GNSS) to provide the geolocation and time information to the GPS receiver if there is an unobstructed line of sight to four or more GPS satellites. However, obstacles such as large building structures may block the weak GPS signals. Thus, the present system using the beam number to determine the geolocation information may provide more accurate geolocation information associated with the location of the user device. The system may use the beam number to determine beam data, including location data of the base station, a beam direction, a beam tilt, a beam power, a beam frequency band (e.g., the Millimeter wave (mmWave) band), and the like. The system may apply any beam allocation algorithm with the beam data as input to determine the geolocation information. The system may use the geolocation information to determine the available location-based services include a cellular network and a Wi-Fi network. The system may determine if the user device is within a geofence of the Wi-Fi network and if yes, the system may automatically authenticate the user device to access the Wi-Fi network.

In various examples, the system may determine a location-based resource to use based on a requested service type and/or prioritization scheme. The system may determine to maintain both a cellular connection and a Wi-Fi connection with the user device. The system may receive signal reports from the devices in an area, and the prioritization scheme may determine the network selection rules based on signal quality and/or strength. In some examples, the location-based resources may include more than one Wi-Fi network, and the prioritization scheme may determine the network selection based on prioritizing a high-security network, a preferred partner network, and/or a user home network. Additionally, the prioritization scheme may include prioritizing Wi-Fi connection use over the cellular connection unless it receives a service request for a specific service type that requires a cellular connection from the user device. The service types may include but are not limited to: an emergency service call, a voice call to a terminating user device, internet access, email access, data transfer, and the like. In some examples, a particular service type (e.g., emergency service call) may only be served by the cellular network, and in response, the system may determine to switch the network, if not already connected, to the cellular network. In an alternative and/or additional examples, the particular service type (e.g., internet access, email access, data transfer) can be served by the Wi-Fi network and/or the cellular network, and in response, the system may determine to switch the network, if not already connected, to the Wi-Fi network. In some examples, the system may generate security tokens for Wi-Fi connections for secured data transfer and/or high-security networks. The system may configure a communication client that may download application data and/or stream data onto the user device.

The systems and methods described herein can be used to deploy a network with wireless nodes configured to support location-based resource allocation. As noted above, traditional cellular networks use base stations to provide wireless connectivity. However, in weak signal regions with high network capacity requirements, the base stations may not provide adequate quality coverage. The present system provides fast and cost-effective deployment of wireless service to these weak signal but densely populated regions. The system may monitor network use and signal quality to determine whether a connection to a device should switch between a cellular network or a Wi-Fi network to optimize network traffic. Additionally, the system may use a priority scheme to further optimize network traffic. Moreover, by allowing automatic authentication to access a location-based network and/or access a location-based application, the system may reduce the resources needed to wait for manual input. These and other improvements to the functioning of a computer and network are discussed herein.

In some examples, the techniques discussed herein can be implemented in the context of protocols associated with one or more of 3G, 4G, 4G LTE, 5G protocols. In some examples, the network implementations can support stand-alone architectures, non-standalone architectures, dual connectivity, carrier aggregation, etc. Example implementations are provided below with reference to the following figures.

FIG. 1 illustrates an example system 100, including network devices configured to support location-based resource allocation.

The user device 102(1) and user device 102(2) (collectively referred to as user devices 102) can communicatively connect with other devices, including network devices(s) (e.g., network devices 104 and 106) associated with a service provider, via one or more network(s) 108. In an example, the example system 100 shows user device 102(1) and user device 102(2) can connect to the one or more network(s) 108 to engage in data transfers and/or any other type of communication. The user device(s) 102 can be any user device that can connect and communicate between the next-generation network (e.g., 5G Standalone (SA)) and the legacy network (e.g., 4G LTE). In some examples, the user device(s) 102 can be a mobile phone, such as a smartphone or other cellular phone. In other examples, the user device(s) 102 can be a personal digital assistant (PDA), a media player, a tablet computer, a gaming device, a smartwatch, a network hub, a personal computer (PC) such as a laptop, desktop, or workstation, or any other type of computing or communication device. The user device(s) 102 may include a SIM card and a communication client. In some examples, the user device(s) 102 may use data from the SIM card to establish connections with corresponding network nodes (e.g., network device(s) 104 and 106) to transmit data, including information to identify the device and/or SIM profile.

The user device(s) 102 may be configured to use a SIM card associated with the service provider. The SIM card may store data ("SIM data" or "SIM profile") associated with the user device(s) 102, the device capabilities, the service provider, subscription information, and the like. In some examples, the SIM profile may indicate the user device(s) 102 is associated with a subscription for the service provider and may further indicate any features and/or services that are supported based on the subscription. For instance, the SIM profile may be an enhanced SIM profile to indicate that the user device(s) 102 is configured to automatically self-authenticate and/or enable location-based services associated with the service provider. The SIM data may include the service provider and/or network information used to authenticate and identify subscribers on the network, the information including, but not limited to, an international mobile subscriber identity (IMSI), authentication key, an Integrated Circuit Card Identification Number (ICCID), Local Area Identity (LAI), Service Provider Name (SPN), Service Dialing Numbers (SDN), a Subscription Concealed Identifier (SUCI), a Subscription Permanent Identifier (SUPI), and the like.

The user device(s) 102 may include a communication client configured to support communication sessions and/or related data transmission. In some examples, the communication client may interface with a user and a network. The communication client may provide access to a user portal to register an associated user device for subscription to wireless service from the service provider. The communication client may generate a user interface or trigger an application to present location-based application content. In various examples, the communication client may configure communication parameters based on the subscription and the access network. The communication parameter may include but is not limited to network selection rules, access type, signal strength, Wi-Fi information, and the like.

In some examples, the user device(s) 102 can wirelessly connect to one or more base stations or other access points of the access networks, and in turn, be connected to the network(s) 108 via the base stations (e.g., network device(s) 104) or other access points (e.g., network device(s) 106). In some examples, the network(s) 108 can be a packet core network of an LTE network, which may be referred to as an Evolved Packet Core (EPC). In other examples, the network(s) 108 can be a 5G core network.

The base station may implement the network device(s) 104 and may include a coverage area with a first Wi-Fi access network 114 and a second Wi-Fi access network 116. The first Wi-Fi access network 114 can include network device(s) 106(1), 106(2), 106(3), 106(4), and 106(5). The second Wi-Fi access network 116 can include network device(s) 106(6) and 106(N).

The network device(s) 106(1), 106(2), 106(3), 106(4), 106(5), 106(6), and 106(N) (collectively referred to as network device(s) 106) can communicatively connect with other devices, including the user devices 102 and other network node(s) (e.g., network device(s) 104) associated with a service provider, via the one or more network(s) 108. In some examples, the network device(s) 104 implemented in the base station and the network device(s) 106 implemented in the Wi-Fi nodes may be configured to automatically authenticate user devices to connect to one or more Wi-Fi networks associated with the service provider and to access any location-based services provided by the Wi-Fi node(s). For instance, the network device(s) 106(1)-106(5) implemented on the first Wi-Fi access network 114, may each be configured to provide access to applications and/or application data related to team information for matches at the stadium. Additionally, the network device(s) 106(6) and 106(N) implemented on the second Wi-Fi access network 116, may each be configured to provide access to applications and/or application data related to event information for shows at the convention hall. The applications and/or application data may be triggered or displayed by the communication clients on the user device(s) 102.

The network device(s) 104 can include a location service component 110 and a scheduler component 112. In some instances, the network device(s) 104 can include implementing one or more communication servers to facilitate communications by and between the various devices in the system 100. That is, the network device(s) 104 can represent any computing devices implementing various aspects of one or more of second, third, fourth, and fifth generation (2G, 3G, 4G, and 5G) cellular wireless access technologies, which may be cross-compatible and may operate collectively to provide data communication services.

Global Systems for Mobile (GSM) is an example of 2G telecommunications technologies; Universal Mobile Telecommunications System (UMTS) is an example of 3G telecommunications technologies; Long Term Evolution (LTE), including LTE Advanced, and Evolved High-Speed Packet Access (HSPA+) are examples of 4G telecommunications technologies; and New Radio (NR) is an example of 5G telecommunication technologies. Thus, the network device(s) 104 may implement GSM, UMTS, LTE/LTE Advanced, and/or NR telecommunications technologies.

In some instances, telecommunication technologies can be referred to generally as radio access technology. Thus, a 5G network can represent 5G radio access technology. The network nodes (e.g., network device(s) 104) may include, but is not limited to, a combination of: base transceiver stations (BTSs) (e.g., NodeBs, Enhanced-NodeBs, gNodeBs), Radio Network Controllers (RNCs), serving GPRS support nodes (SGSNs), gateway GPRS support nodes (GGSNs), proxies, a mobile switching center (MSC), a mobility management entity (MME), a serving gateway (SGW), a packet data network (PDN) gateway (PGW), an evolved packet data gateway (e-PDG), an Internet Protocol (IP) Multimedia Subsystem (IMS), or any other data traffic control entity configured to communicate and/or route data packets between the user device(s) 102, the network device(s) 104 and 106, and/or the network(s) 108. In some embodiments, the network device(s) 104 and 106 may be operated by one or more service providers. A service provider may include a wireless service provider, telecommunications service provider, cellular carrier, network operator, mobile operator, and the like. The network device(s) 104 and 106 and associated components, including the location service component 110 and the scheduler component 112, may configure a database to maintain subscriber information with associated SIM card information and network information with associated Wi-Fi network information to support the network system. In various examples, the system may receive, from a user device, data for requesting access to the network and/or data for maintaining the connection to the network. If not yet authenticated, the system may authenticate the user device(s) 102 to access the cellular network of the base station. In some examples, the system may determine whether the data includes SIM data indicating an enhanced SIM profile. If the SIM data indicates an enhanced SIM profile, the location service component 110 may determine which location-based resource is available to the user device. The scheduler component 112 may determine an allocation for the resources available between all the currently connected user devices. Additionally, based at least in part on the enhanced SIM profile, the location service component 110 may determine to automatically authenticate the user device to access a new Wi-Fi network.

The location service component 110 may include functions to identify the location-based resources available. The location-based resources may include but are not limited to: wireless networks, file access, application access, discount offers, media access, and the like. In some examples, the location service component 110 may be implemented on a network device associated with a network node (e.g., base station, wireless access point, etc.) and may facilitate communication between the network nodes and other devices in the network. In various examples, the location service component 110 implemented on the network device(s) 104 may receive and store network data for one or more Wi-Fi networks within the coverage area of the base station. The network data may include information for each Wi-Fi network, including access point locations and/or a geofence for the Wi-Fi network. The geofence may be defined by: (1) a predetermined radius from an access point location or (2) a predetermined geographical boundary defining a polygon (e.g., inside a boundary defined by three or more coordinates). For instance, the network data for the first Wi-Fi access network 114 may include Wi-Fi access information, the geolocations of the network device(s) 106(1)-106(5), and the geofence may be defined by the four geolocation corners of the stadium. In various examples, the location service component 110 may receive data from a user device 102 inside the coverage area of the base station. The data may include SIM data and a beam number of the base station in connection with the user device.

The location service component 110 may use the beam number to determine geolocation information associated with the location of the user device. As discussed herein, the user device may include a GPS receiver to receive and report the geolocation and time information obtained from GPS satellites; however, the geolocation may be inaccurate inside large building structures that may block the weak GPS signals. The location service component 110 may use the beam number to determine beam data, including location data of the base station, a beam direction, a beam tilt, a beam power, a beam frequency band (e.g., the Millimeter wave (mmWave) band), and the like. The location service component 110 may apply any beam allocation algorithm with the beam data as input to determine the geolocation information. The location service component 110 may use the geolocation information to determine the available location-based services include a cellular network and a Wi-Fi network. The location service component 110 may determine if the user device is within the Wi-Fi network geofence. In response to affirmative, the location service component 110 may automatically authenticate the user device to access the Wi-Fi network.

In some examples, the location service component 110 may include functions to automatically download data associated with a location-based resource. The location service component 110 may determine, based on accessing the Wi-Fi network, that a current location has a location-based resource available. In response to a type of location-based resource available, the location service component 110 may download associated data and/or trigger an associated application on the user device(s) 102. The type of location-based resource may include a media file, a data file for advertisement, an application trigger, a streaming file, and the like. In response to an application trigger, the location service component 110 may cause a communication client to display a prompt on the user device(s) 102 to confirm opening an application. In some examples, the user may grant, via a user account setting, permission for the system to automatically confirm and trigger a location-based application. In response to either a manual or automatic confirmation, the location service component 110 may trigger the application. For instance, a ski resort may have a ski tracker application to measure the number of runs you've taken; the location service component 110 may trigger the ski tracker application based on the user device(s) 102 being at the ski resort.

The scheduler component 112 may determine location-based resources available and allocate the resources available. As described herein, the location service component 110 may receive, from a user device 102, a request to establish a first wireless connection with a base station and a second wireless connection to a Wi-Fi node. In response to establishing the two wireless connections, the scheduler component 112 may determine the location-based resource allocation for the network. In some examples, the allocation of network resources may be based at least in part on a requested service type from the user device. In alternative and/or additional examples, the allocation of network resources may be based at least in part on one or more prioritization schemes. In various examples, the prioritization schemes may include one or more network selection criteria, network selection priority rules, user-defined priority rules, and the like. The network selection criteria may include predefined criteria for prioritizing a network (e.g., prioritizing network signal quality but only switch when the quality difference exceeds a threshold). The network selection priority rules may include predefined rules for prioritizing a network (e.g., prioritizing a Wi-Fi network unless service type requires a cellular network; prioritizing a more network with more security features, prioritizing a partner and/or affiliated network). The user-defined priority rules may include a list of user-defined rules for prioritizing a network over another (e.g., prioritizing my home Wi-Fi network when available). The scheduler component 112 may maintain both the cellular connection and the Wi-Fi connection for a user device and select the connection based on service requests. The scheduler component 112 may receive signal reports from user devices in the coverage area.

In various examples, the scheduler component 112 may use one or more prioritization schemes to select from the available network(s). In an example, a prioritization scheme may be based on the signal quality and/or signal strength of each available network(s). In some examples, the available network(s) may include two or more Wi-Fi networks, and the prioritization scheme may be based on a security level, an association with the service provider, and an association with the user. Additionally, the prioritization scheme may include prioritizing Wi-Fi connections over cellular connections unless the scheduler component 112 receives, from the user device, a service request for a specific service type that requires a cellular connection. The service types may include but are not limited to an emergency service call, a voice call to a terminating device, internet access, email access, data transfer, and the like. In some examples, a particular service type (e.g., emergency service call) may only be served by the cellular network; thus, the scheduler component 112 may switch the serving network, if necessary, to the cellular network. In various examples, the scheduler component 112 may poll a Wi-Fi network to determine the network capabilities, including network security level and speed. In additional examples, the scheduler component 112 may generate a security token for a Wi-Fi connection for secured data transfer and/or high-security network. The scheduler component 112 may cause a communication client on the user device to download application data and/or stream data on the user device.

While FIG. 1 illustrates the network(s) 108, it is understood in the context of this document that the techniques discussed herein may also be implemented in other networking technologies, such as nodes that are part of a wide area network (WAN), metropolitan area network (MAN), local area network (LAN), neighborhood area network (NAN), personal area network (PAN), or the like. Examples of the network(s) 108 can include but are not limited to networks including second-generation (2G), third-generation (3G), fourth-generation (4G) cellular networks, such as LTE (Long Term Evolution), fifth-generation (5G) networks, and data networks, such as Wi-Fi networks.

In some instances, the network device(s) 104 and 106 can communicate with any number of user equipment, user devices, servers, network devices, computing devices, and the like.

As a non-limiting example, the example system 100 can illustrate an example network with a base station configured to support location-based resource allocation. The location-based resources may include one cellular network and two Wi-Fi networks within the base station coverage area. The example system 100 includes an example network, including a network device(s) 104 of a base station with an example cellular coverage area that overlaps an example first Wi-Fi access network 114 and an example second Wi-Fi access network 116. The example cellular coverage area is in a densely packed weak signal region, including a large stadium and a convention hall, and has a high network capacity requirement.

The example first Wi-Fi access network 114 includes example network device(s) 106(1)-106(5). The example first Wi-Fi access network 114 provides Wi-Fi network coverage for a large stadium. In the present example, a soccer match is playing at the stadium. A first user is watching the match and operating the user device 102(1) within the coverage area of the example first Wi-Fi access network 114.

In the present example, the user device 102(1) is communicatively connected to the base station. The network device(s) 104 may receive data (e.g., the example data 118) from the user device 102(1). The example data 118 may include SIM data and a beam number of the base station in connection with the user device 102(1). The location service component 110 located on the network device(s) 104 may determine, based on the SIM data, that the user device 102(1) is using a SIM card configured with an enhanced SIM profile. Additionally, the location service component 110 may use the beam number to determine the first geolocation information associated with the first location of the user device 102(1).

The location service component 110 may use the first geolocation information to determine that the location-based resources include the cellular network provided by the base station and the example first Wi-Fi access network 114. The location service component 110 may determine that the first location of the user device 102(1) is within a geofence of the example first Wi-Fi access network 114 and determine that the example network device(s) 106(5) is the nearest access point. The location service component 110 may transmit example data 120, which may include network credential information, to the example network device(s) 106(5). The system may automatically authenticate the user device 102(1) to access the example first Wi-Fi access network 114 without any input from the first user. In some instances, the location service component 110 may determine based on the first location of the user device 102(1) that location-based example application data 122 is available and transmits the example application data 122 to the user device 102(1). An example communication client on the user device 102(1) may present the example application data 122. In the present examples, the user device 102(1) may be prompted with a user interface for viewing the team stats. The user interface may include one or more graphical elements to present the example team stats. The graphical elements may include but are not limited to 2-dimensional graphical elements, 3-dimensional graphical elements, augmented reality graphical elements, and the like.

The example second Wi-Fi access network 116 may include the network device(s) 106(6) and 106(N) to provide wireless coverage for the convention hall next to the stadium. In the present example, a concert is playing at the convention hall, and a second user is operating an example user device 102(2) within the geofence of the example second Wi-Fi access network 116.

In the present example, the user device 102(2) may have established a connection to the base station with the network device(s) 104. The network device(s) 104 may receive the example data 124 from the example user device 102(2). The example data 124 may include SIM data and a beam number of the base station in connection with the example user device 102(2). The location service component 110 located on the network device(s) 104 may determine, based on the SIM data, that the user device 102(2) uses a SIM card configured with an enhanced SIM profile. Additionally, the location service component 110 may use the beam number to determine second geolocation information associated with a second location of the user device 102(2).

The location service component 110 may use the second geolocation information to determine the available location-based resources. The resources include the cellular network provided by the base station and the example second Wi-Fi access network 116. The location service component 110 may determine that the second location of the user device 102(2) is within a geofence of the example second Wi-Fi access network 116. Additionally, the system may determine that although the example network device(s) 106(5) is the nearest access point (based on distance), the example network device(s) 106(N) is the nearest access point within the geofence of the example second Wi-Fi access network 116. The location service component 110 may transmit example data 126 to the example network device(s) 106(N). The example data 126 may include network credential information to automatically authenticate the user device 102(2) to access the example second Wi-Fi access network 116 without any input from the second user. In some examples, the location service component 110 may determine example application data 128 is available for the second location. The system may transmit the example application data 128 to the user device 102(2). An example communication client on the user device 102(2) may present the example application data 128. In the present examples, the communication client may generate a user interface for triggering an example media application "MediaZ" to display the song lyrics for a song currently playing.

Figure 2:
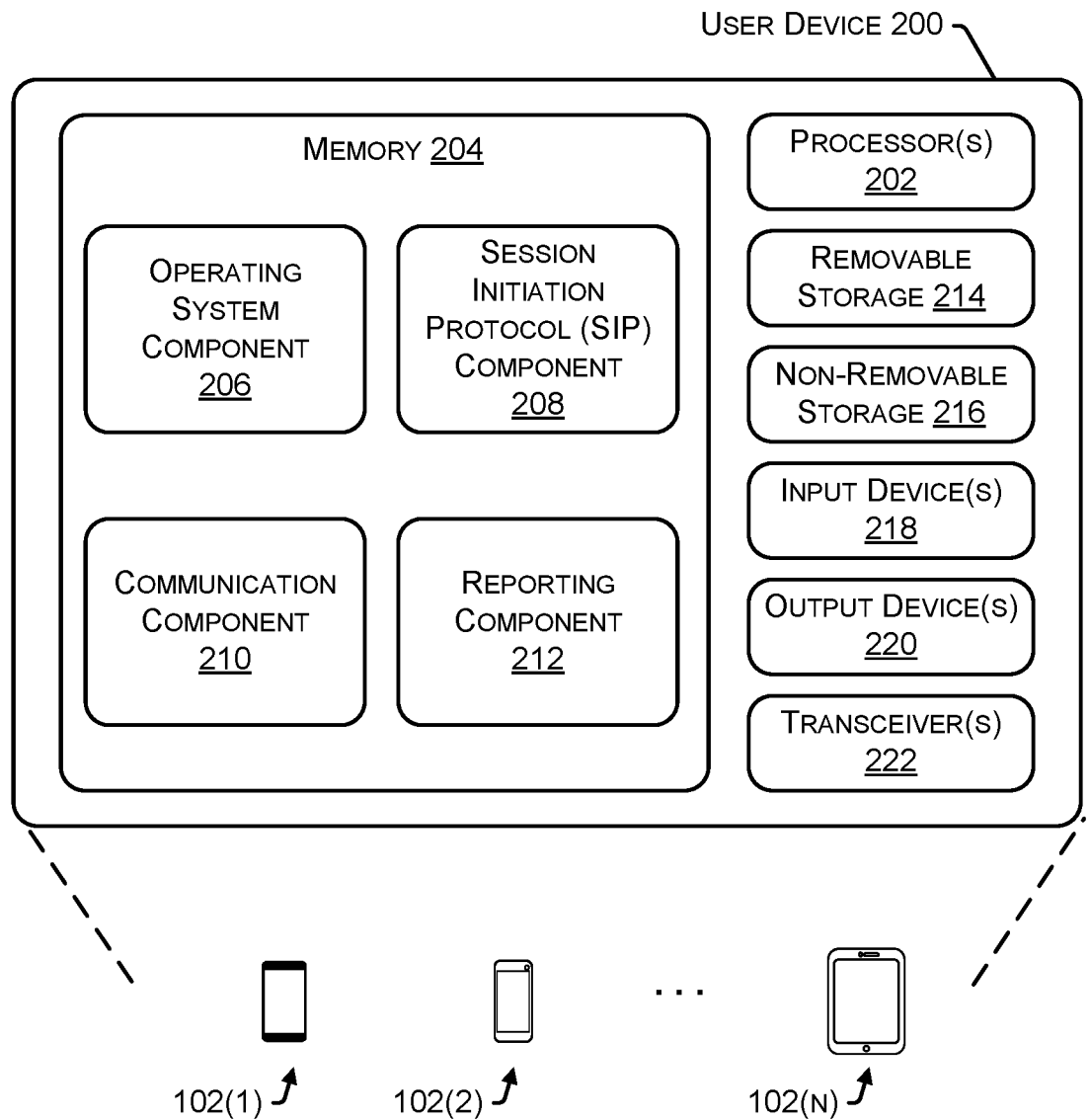
FIG. 2 is a block diagram of a user device.

FIG. 2 is a block diagram of user device 200 configured to use network service. In some embodiments, the user device 200 can correspond to the user device 102(1), 102(2), . . . , 102(N) of FIG. 1. It is to be understood in the context of this disclosure that the user device 200 can be implemented as a single device or as a plurality of devices with components and data distributed among them. By way of example, and without limitation, the user device 200 can be implemented as various user device 200(1), 200(2), . . . , 200(N).

As illustrated, the user device 200 comprises a memory 204 storing an operating system component 206, a Session Initiation Protocol (SIP) component 208, a communication component 210, and a reporting component 212. Also, the user device 200 includes processor(s) 202, a removable storage 214 and non-removable storage 216, input device(s) 218, output device(s) 220, and transceiver(s) 222.

In various embodiments, the memory 204 is volatile (such as RAM), non-volatile (such as ROM, flash memory, etc.) or some combination of the two. The operating system component 206, the SIP component 208, the communication component 210, and the reporting component 212 stored in the memory 204 can comprise methods, threads, processes, applications, or any other sort of executable instructions. The operating system component 206, the SIP component 208, the communication component 210, and the reporting component 212 can also include files and databases.

The operating system component 206 can include functionality to identify and track the different applications installed on the user device 200. The operating system component 206 can include functionality to query a chipset of the user device 200, and/or query the transceiver(s) 222, to instruct the transceiver(s) 222 and/or any software or hardware to scan one or more channels or frequency resources to determine metrics associated with the channel or frequency resources, for example. In some instances, the operating system component 206 can include an API to receive instructions from one or more of the SIP component 208, the communication component 210, and the reporting component 212 and to provide data to the corresponding components, including identifying the communication clients and/or communication capabilities of the user device 200 and/or a serving network, and notifying the components of clients and/or capabilities. The serving network may include one or more network(s) that the user device 200 is currently communicatively connected to. For instance, the user device 200 may be connected to a cellular network and/or connected to a Wi-Fi network.

The SIP component 208 may enable communications to be served using SIP instances and/or SIP messages. The SIP component 208 may transmit SIP messages containing information for identifying a subscriber account, a SIM profile, a device identifier, a service request including an associated service type, and/or the communication client to serve a communication session including but not limited to: SIP instance information, access network information, Mobile Station International Subscriber Directory Number (MSISDN), International Mobile Subscriber Identity (IMSI), International Mobile Equipment Identity (IMEI) of the device, Universally Unique Identifier (UUID), called-party-address as Circuit-Switched Routing Number (CSRN), and session description protocol (SDP). The SIP component 208 may use SIP signaling and determine the current location of the user device 200 using a Global Positioning System (GPS). In various examples, the SIP component 208 may transmit SIP messages with headers and/or strings to trigger specific functions and/or commands.

The communication component 210 may configure a communication client for send and receive communication data. The communication component 210 may include functions to support communication sessions and/or related data transmission. The communication component 210 may determine the capability of the user device 200 and the serving network to determine the enabled feature information for a communication client. The serving network may include one or more network(s) 108 that the user device 200 is currently registered on. In response to registering to a network, communication component 210 may send, to the network, a publish request to set the enabled feature information of the communication client (e.g., location-based service enabled, a location-based application installed, etc.). While the communication component 210 may send the enabled feature information to the network, it is understood in the context of this document that the user device 200 may send and/or receive the enabled feature information via the SIP component 208, the communication component 210, the reporting component 212, and/or another component.

The communication component 210 may include functionality to determine when to transition an existing communication from one access network to another. The communication component 210 may receive a command from the network device(s) 300 to transition an existing serving connection from a cellular network to a Wi-Fi network or from the Wi-Fi network to the cellular network. In some examples, the communication component 210 may perform functions, such as interfacing with the transceiver(s) 222, preparing the user device 200 to receive communications, tuning the transceiver(s) 222, receiving and processing an invitation message such as a SIP instance received via the transceiver(s) 222, and the like. The communication component 210 may receive network quality information from the transceiver(s) 222 and may determine to transition an existing serving connection from one access network to another. As described herein, the present system may prioritize Wi-Fi network use over the cellular network. In some examples, if the communication component 210 determines that a Wi-Fi signal is weak (e.g., a home Wi-Fi network is down), the communication component 210 may transition a serving connection from the Wi-Fi network to the cellular network. In various examples, the communication component 210 may call the reporting component 212 to report the network quality information to the network.

The reporting component 212 may include functions to report on the network quality. In some examples, the communication component 210 may use the transceiver(s) 222 to perform a network quality test; and the reporting component 212 may transmit the results with location and/or network information. In various examples, the reporting component 212 may report on the network quality to a core network device to enable the core network to determine if a particular wireless node is weak or down.

In some embodiments, the processor(s) 202 is a central processing unit (CPU), a graphics processing unit (GPU), or both CPU and GPU, or other processing unit or component known in the art.

The user device 200 also includes additional data storage devices (removable and/or non-removable) such as, for example, magnetic disks, optical disks, or tape. Such additional storage is illustrated in FIG. 2 by removable storage 214 and non-removable storage 216. Tangible computer-readable media can include volatile and non-volatile, removable and non-removable media implemented in any method or technology for storage of information, such as computer-readable instructions, data structures, program modules, or other data. Memory 204, removable storage 214, and non-removable storage 216 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the user device 200. Any such tangible computer-readable media can be part of the user device 200.

In various embodiments, the user device 200 can include applications including but are not limited, a web browser application, a video streaming application, an online gaming application, a network analyzer, and the like. During execution on the user device 200, each of the applications may be configured to cause the user device 200 to initiate communications with a network node (e.g., network device 300) over the network(s) 108.

The user device 200 may be configured to communicate over a telecommunications network using any common wireless and/or wired network access technology. Moreover, the user device 200 may be configured to run any compatible device operating system (OS), including but not limited to Microsoft Windows Mobile, Google Android, Apple iOS, Linux Mobile, as well as any other common mobile device OS.

The user device 200 also can include input device(s) 218, such as a keypad, a cursor control, a touch-sensitive display, a voice input device, etc., and output device(s) 220 such as a display, speakers, printers, etc. These devices are well known in the art and need not be discussed at length here.

As illustrated in FIG. 2, the user device 200 also includes one or more wired or wireless transceiver(s) 222. For example, the transceiver(s) 222 can include a network interface card (NIC), a network adapter, a LAN adapter, or a physical, virtual, or logical address to connect to the network(s) 108 or to the network device (e.g., network device 300). To increase throughput when exchanging wireless data, the transceiver(s) 222 can utilize multiple-input/multiple-output (MIMO) technology. The transceiver(s) 222 can comprise any sort of wireless transceiver capable of engaging in wireless radio frequency (RF) communication. The transceiver(s) 222 can also include other wireless modems, such as a modem for engaging in Wi-Fi, WiMax, Bluetooth, infrared communication, and the like.

In some examples, the user device 200 can be implemented as the user device(s) 102(1) and 102(2) of FIG. 1.

Figure 3:
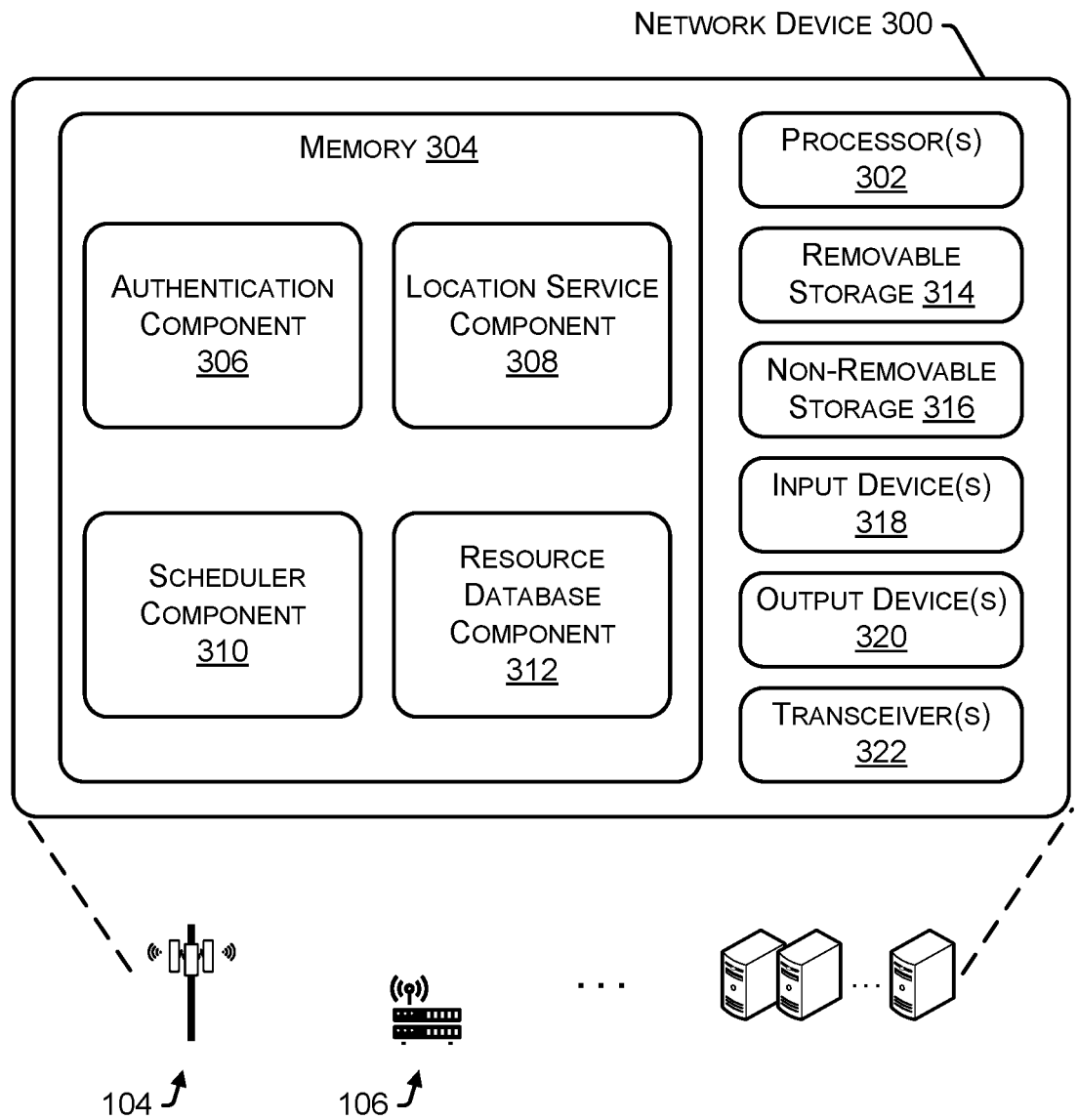
FIG. 3 is a block diagram of a network device configured to support location-based resource allocation.

FIG. 3 is a block diagram of a network device 300 configured to support location-based resource allocation. In some examples, the network device 300 can be configured to implement the techniques discussed herein.

In various examples, the network device 300 may include processor(s) 302 and memory 304. Depending on the exact configuration and type of computing device, the memory 304 may be volatile (such as RAM), non-volatile (such as ROM, flash memory, etc.), or some combination of the two.

FIG. 3 shows basic, high-level components of the network device 300. Generally, the network device 300 may comprise and/or may be implemented in any of various network components discussed herein, including those components illustrated in FIG. 1. For example, the network device 300 may be implemented in the network device(s) 104 and 106 and the network(s) 108 or other network devices.

The memory 304 may include an authentication component 306, a location service component 308, a scheduler component 310, and a resource database component 312.

The authentication component 306 can include functionality to identify and/or authenticate user devices and/or any other communications components to interact with the network. The authentication component 306 may receive requests to initiate a device. The authentication component 306 may authorize the device to connect to the network by determining that the device has a valid SIM card. As described herein, the system may configure a SIM card to use an enhanced SIM profile indicating that an associated user device is configured to automatically self-authenticate and/or enable location-based services associated with the service provider. In response to a successful authentication for the user device, the authentication component 306 may grant authorization for the services that the device is allowed to access based on one or more of a device capability, a SIM profile, available location-based resources, a device location, subscription data, and the like. The authorization may be executed during a device registration procedure. In various examples, the authentication component 306 may determine that a SIM card is associated with an enhanced SIM profile.

The authentication component 306, at a base station, may receive SIM data, authenticate the user device, and determine based on the SIM data that the user device is associated with an enhanced SIM profile. The SIM card may be a physical SIM card or an electronic SIM (eSIM) card. In some examples, the SIM card may use an enhanced SIM profile to automatically authorize access for a location-secured application, based on a predetermined secure location, from a high-security network. The predetermined secured location is compared with respect to the current geolocation of the user device. The current geolocation of the user device is determined based on beam information as described herein, with respect to the location service component 110 of FIG. 1. In some examples, the system may detect a device with the enhanced SIM profile is trying to access the location-secured application from a different geographical location and/or from a spoofed location and determine not to authenticate the SIM profile for application access.

As will be described herein with additional details in the example system of FIG. 4, the system may determine, using beam data, that a user device has entered a geofence of the predetermined secure location. In response, the system may automatically authorize access to a classified location-secured development project.

In some examples, the authentication component 306 may use a SIM card to automatically authorize access to a wireless network. In various examples, the network device 300 may be implemented in a wireless node and may receive enhanced SIM profiles associated with the service provider. The enhanced SIM profile may indicate an associated user device is configured to automatically self-authenticate for and/or automatically enable location-based services associated with the service provider.

The authentication component 306 may retrieve data from a subscriber database, data repository, and/or any other database to verify a subscriber account and/or associated device is authorized to use the services provided by the network device 300.

The location service component 308 can include functions to provide support for location-based resource allocation for user devices. In some instances, the location service component 308 can correspond to the location service component 110 of FIG. 1. As described herein with respect to the location service component 110, the location service component 308 may include functions to identify the location-based resources available. In some examples, the location service component 308 may facilitate communication between the wireless nodes and user devices in the network. In various examples, the location service component 308 implemented on the network device(s) 300 of an associated base station may receive and store network data for one or more Wi-Fi networks within a coverage area of the base station. The network data may include information for each Wi-Fi network of one or more Wi-Fi networks, including access point locations and/or a geofence for the network. The geofence may be defined by a predetermined radius from an access point or by predetermined geolocation coordinates defining boundaries ("geographical boundaries"). In various examples, the location service component 308 may receive data from a user device 200 that has entered into the coverage area of the base station. The data may include SIM data and a beam number of the base station in connection with the user device.

In some examples, the location service component 308, implemented on a network device of a base station, may facilitate communication between the base station, the wireless nodes, and the user devices within the coverage area of the base station. In various examples, the location service component 308 may receive a network access request from a device, and the authentication component 306 may authenticate the device.

In some examples, the location service component 308 may use the beam number to determine geolocation information associated with the location of the user device. The location service component 308 may use the beam number to determine beam data, including location data of the base station, a beam direction, a beam tilt, beam power, a beam frequency band, and the like. The location service component 308 may apply any beam allocation algorithm with the beam data as input to determine the geolocation information. The location service component 308 may use the geolocation information to determine the available location-based services include a cellular network and a Wi-Fi network. The location service component 308 may determine if the user device is within a geofence of the Wi-Fi network. If the user device is within the geofence, the location service component 308 may automatically authenticate the user device to access the Wi-Fi network.

In various examples, the location service component 308 may include functions to automatically download data associated with a location-based resource. The location service component 308 may determine, based on accessing the Wi-Fi network, that a current location has a location-based resource available. In response to a type of location-based resource available, the location service component 308 may download associated data and/or trigger an associated application on a user device 200. The type of location-based resource may include a media file, a data file, a database, an application trigger, a streaming file, and the like. In response to a database, the location service component 308 may cause a communication client to display a prompt on the user device 200 to confirm access to a database granted. For instance, a company may have proprietary software on a secured database, which may typically be accessed by a security dongle; the location service component 308 may automatically grant access to a user account associated with the user device 200 based on location. In response to an application trigger, the location service component 308 may cause a communication client to display a prompt on the user device 200 to confirm opening an application. In some examples, the user may grant, via privilege settings, permission for the system to automatically confirm and trigger the location-based application. In response to either a manual or automatic confirmation, the location service component 308 may initiate the application. For instance, a ski resort may have a ski tracker application to measure the number of runs you've taken; the location service component 308 may trigger the ski tracker application based on the user device 200 being at the ski resort.

The location service component 308 can collect data associated with a user ("subscriber") in a subscriber database. In some examples, the location service component 308 may include a common data repository of subscriber information and can be used to service network functions and/or used to determine the service available to a subscriber. The common data repository can be a shared database providing support for 2G/3G/4G/5G core and can store subscriber data, including subscriber information.

The location service component 308 may maintain a subscriber database with associated SIM data. The location service component 308 can collect data associated with subscribers, subscriber sessions, and/or registrations in the subscriber database. In various examples, the location service component 308 may utilize a common data repository, a shared database providing support for 2G/3G/4G/5G core, to store subscriber data, including subscriber information. The location service component 308 may collect and store information specific to the subscriber accounts and subscription, including one or more of username, account identifier, subscription plan, services, data allocated, data used, prepaid charge, and the like. The location service component 308 can also collect information specific to a user device associated with a subscriber account, including a network prioritization scheme, privilege settings, stored network accessed information, secured network access privileges, device capabilities, a device identifier, a communication client capabilities, applications installed, application data, and the like. The device identifier may include Mobile Station International Subscriber Directory Number (MSISDN), International Mobile Subscriber Identity (IMSI), International Mobile Equipment Identity (IMEI) of the device, Universally Unique Identifier (UUID), and the like.

The scheduler component 310 may include functions to configure wireless nodes to provide coverage for a network. The wireless nodes may include base stations and/or Wi-Fi access points. In some instances, the scheduler component 310 can correspond to the scheduler component 112 of FIG. 1. As described herein with respect to the scheduler component 112, the scheduler component 310 may determine location-based resources available and determine allocation for the resources. As described herein, the location service component 308 may establish, for a user device, a first wireless connection with a base station node and a second wireless connection to a Wi-Fi node. In response to establishing the two wireless connections, the scheduler component 310 may determine the location-based resource allocation for the network. The resource allocation may be based at least in part on a requested service type from the user device and/or one or more prioritization schemes. The scheduler component 310 may maintain both the cellular connection and the Wi-Fi connection with the user device and may receive signal reports from other user devices in the coverage area. In various examples, the scheduler component 310 may determine a prioritization scheme based on signal quality and/or strength of each available network(s).

In some examples, the location-based resources may include two or more Wi-Fi networks, and the scheduler component 310 may determine a prioritization scheme based on network security level, affiliated network status, and/or user home network. Additionally, the prioritization scheme may include prioritizing Wi-Fi connection use over the cellular connection unless the scheduler component 310 receives a service request for a specific service type that requires a cellular connection from the user device. The service types may include but are not limited to an emergency service call, a call to a terminating device, internet access, email access, data transfer, and the like. In additional examples, the scheduler component 310 may generate a security token for a Wi-Fi connection for secured data transfer and/or high-security network. The scheduler component 310 may cause a communication client on the user device to download application data and/or stream data on the user device.

The scheduler component 310 may perform different functions based on whether the scheduler component 310 is on a network device on a base station and/or a Wi-Fi node. The scheduler component 310 may determine location-based resources available for the coverage area associated with the base station and determine allocation for the resources based on the user devices connected to the base station. The scheduler component 310 may transmit data, including commands for the base station and/or the Wi-Fi nodes, to allocate a location-based resource. In some examples, the scheduler component 310 may transmit data, including commands for a communication client on a user device to reallocate or receive a location-based resource.

In various examples, the scheduler component 310 may be running from a network device on a Wi-Fi node and may configure the Wi-Fi node to transmit location-based resource data. The scheduler component 310 may receive a network schedule from a core network device. The scheduler component 310 may transmit specific location-based resource data according to the network schedule. In some instances, by default, the scheduler component 310 may configure a stadium Wi-Fi node to transmit, to user devices, general stadium information (e.g., hours, maps, etc.). In additional and/or alternative examples, the scheduler component 310 may configure the stadium Wi-Fi node to transmit, to user devices, specific sports team and/or match information during game time.

In some examples, the scheduler component 310 may monitor traffic data associated with the network to continuously optimize the network. The traffic data may include data associated with network signal quality, capacity, connectivity, and the like. The data associated with network signal quality may include one or more of Channel Quality Information (CQI) data, signal-to-noise ratio (SNR) data, signal-to-interference plus noise ratio (SINR) data, and/or signal-to-noise plus distortion ratio (SNDR) data. As described herein, if a particular wireless node is weak or disconnected, the scheduler component 310 may send messages and commands for a user device to switch to a different network. The scheduler component 310 may determine a network signal quality falls below a signal quality threshold and transmit a message and/or command to the user device and/or wireless node to switch serving network. If an amount of data transfer (e.g., greater than 500 MB data) meets or exceeds a threshold, the scheduler component 310 may change the serving network to an available Wi-Fi network. In an alternative example, if there is no available Wi-Fi network, the scheduler component 310 may pause the data transfer.

The resource database component 312 may maintain a resource database with associated location-based resource data. The resource database component 312 can collect data associated with network information, location-based applications, location-based application data, and the like. In various examples, the resource database component 312 may utilize a common data repository, a shared database providing support for 2G/3G/4G/5G core, to store shared location-based resource data, including associated Wi-Fi information. The resource database component 312 may collect and store location-based resource data specific to a particular location and/or associated with a particular Wi-Fi network. As described herein, the scheduler component 310 may configure the Wi-Fi node to transmit specific location-based resource data according to a network schedule. The resource database component 312 may store and recall the specific location-based resource data as needed according to the network schedule. The resource database component 312 may determine, based on the geolocation information, a network service associated with the location, the network service including a location-based application. The scheduler component 310 may call the resource database component 312 to transmit, to the user device via the Wi-Fi network, data associated with the location-based application. For instance, the scheduler component 310 may call the resource database component 312 to transmit specific team data during game time.

In some examples, the processor(s) 302 is a central processing unit (CPU), a graphics processing unit (GPU), both CPU and GPU, or other processing unit or component known in the art. Furthermore, the processor(s) 302 may include any number of processors and/or processing cores. The processor(s) 302 is configured to retrieve and execute instructions from memory 304, respectively.

The memory 304 can also be described as non-transitory computer-readable media or machine-readable storage memory and may include removable and non-removable media implemented in any method or technology for storage of information, such as computer-executable instructions, data structures, program modules, or other data.

The memory 304 may include, but is not limited to, RAM, ROM, EEPROM, flash memory or other memory technology, CD-ROM, digital versatile discs (DVD) or other optical storage, magnetic cassettes, magnetic tape, magnetic disk storage or other magnetic storage devices, or any other tangible, physical medium which can be used to store the desired information.

The network device 300 also includes additional data storage devices (removable and/or non-removable) such as, for example, magnetic disks, optical disks, or tape. Such additional storage is illustrated in FIG. 3 by removable storage 314, and non-removable storage 316. Tangible computer-readable media can include volatile and non-volatile, removable and non-removable media implemented in any method or technology for storage of information, such as computer-readable instructions, data structures, program modules, or other data. The memory 304, the removable storage 314, and the non-removable storage 316 are all examples of computer-readable storage media. Computer-readable storage media include, but are not limited to, RAM, ROM, EEPROM, flash memory or other memory technology, CD-ROM, digital versatile discs (DVD), content-addressable memory (CAM), or other optical storage, magnetic cassettes, magnetic tape, magnetic disk storage or other magnetic storage devices, or any other medium which can be used to store the desired information and which can be accessed by the corresponding network device 300. Any such tangible computer-readable media can be part of the network device 300.

The memory 304, the removable storage 314, and/or the non-removable storage 316 may in some cases include storage media used to transfer or distribute instructions, applications, and/or data. In some cases, the memory 304, the removable storage 314, and/or the non-removable storage 316 may include data storage that is accessed remotely, such as network-attached storage that the corresponding network device 300 accesses over some type of data communications network.

In various examples, any or all of the memory 304, the removable storage 314, and/or the non-removable storage 316 may store programming instructions that, when executed, implement some or all of the function functionality described herein.

The network device 300 also can include input device(s) 318, such as a keypad, a cursor control, a touch-sensitive display, a voice input device, etc., and output device(s) 320 such as a display, speakers, printers, etc. These devices are well known in the art and need not be discussed at length here.

As illustrated in FIG. 3, the network device 300 also includes one or more wired or wireless transceiver(s) 322, respectively. For example, the transceiver(s) 322 can include a network interface card (NIC), a network adapter, a LAN adapter, or a physical, virtual, or logical address to connect to the various network device(s), or components illustrated in figures herein. To increase throughput when exchanging wireless data, the transceiver(s) 322 can utilize multiple-input/multiple-output (MIMO) technology. The transceiver(s) 322 can comprise any sort of wireless transceiver capable of engaging in wireless radio frequency (RF) communication. The transceiver(s) 322 can also include other wireless modems, such as a modem for engaging in Wi-Fi, WiMAX, Bluetooth, infrared communication, and the like.

In some examples, the network device 300 can be implemented as the network device(s) 104 and 106 of FIG. 1, including the location service component 110 and/or the scheduler component 112.

Figure 4:
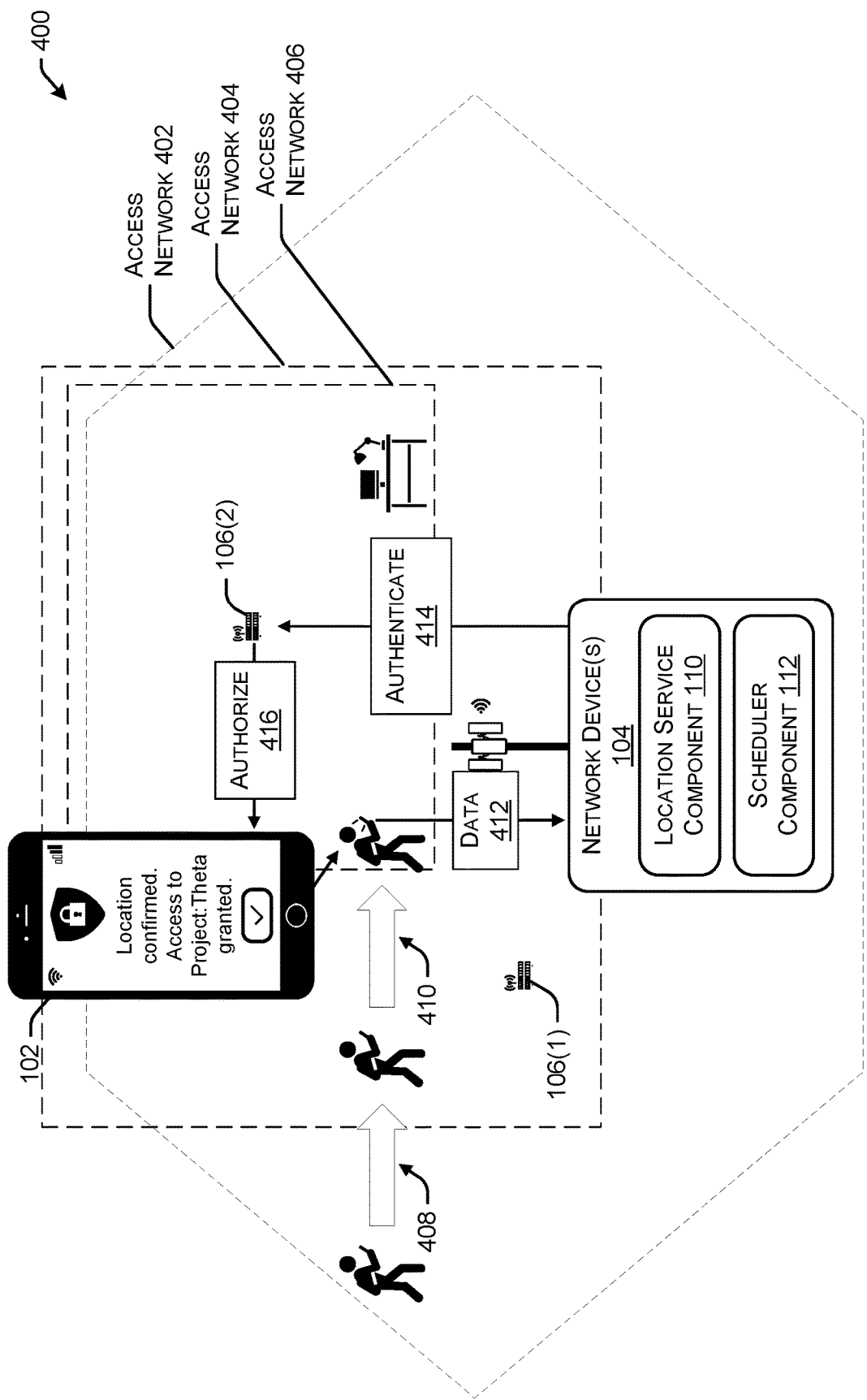
FIG. 4 is a schematic diagram showing an example system including network devices configured to support location-based resource allocation.

FIG. 4 is an example system 400 illustrating network devices configured to support location-based resource allocation. The example system 400 may include the example network device(s) 104, 106(1), and 106(2) configured to provide example access networks 402, 404, and 406, respectively.

In a non-limiting example, a user associated with an example user device 102 may travel from a first network coverage area (e.g., the example access network 402), into a second network coverage area (e.g., the example access network 404), and finally, to a third network coverage area (e.g., the example access network 406). Initially, the network device(s) 104 can authenticate the example user device 102 to connect to a cellular network via the example access network 402. The location service component 110 implemented on the example network device(s) 104 of the base station received and stored network data for the two Wi-Fi networks within a coverage area of the base station (e.g., the examples access network 402). The network data includes information for a first Wi-Fi network, including the example network device(s) 106(1) location and a first example geofence of the first Wi-Fi network. In the present example, the first example geofence is illustrated by predetermine geolocation coordinates defining an octagonal area of the examples access network 404.

In the present non-limiting example, the user may move between multiple access networks while carrying the user device 102. The user may travel to example transition 408 from a first coverage region associated with the example access network 402 into a second coverage region associated with the example access network 402 and the example access network 404. The location service component 308 may receive, from the user device 102, data including SIM data and a beam number to determine geolocation information associated with a location of the user device. The location service component 110 may use the geolocation information to determine the available location-based services now include the cellular network (e.g., the example access network 402) and a Wi-Fi network (e.g., the example access network 404). The location service component 110 may determine, based on the SIM data of the user device 102, to automatically authenticate the user device to access the example access network 404.

In an additional non-limiting example, the user may move and travel to example transition 410 from the second coverage region associated with the example access network 404 into a third coverage region associated with the example access network 404 and the example access network 406. The location service component 110 may receive, from the user device 102, updated data and determine updated beam data. The location service component 110 may determine updated geolocation information associated with an updated location of the example user device 102. The location service component 110 may use the updated location to determine the available location-based services include the cellular network, the first Wi-Fi network, and a second Wi-Fi network. The present example system may prioritize connection to the example access network 406 over the example access network 404 because the example access network 406 is a high-security network and includes a location-secured application. The location service component 110 may determine, based on the example data 412 received from the user device 102, to perform an example authentication process 414 for the user device 102 to access the example access network 406. The system may automatically perform an example authorization process 416 to authorize the user device 102 to access the location-secured classified application. A communication client on the user device 102 may notify the user of the security access granted.

Figure 6:
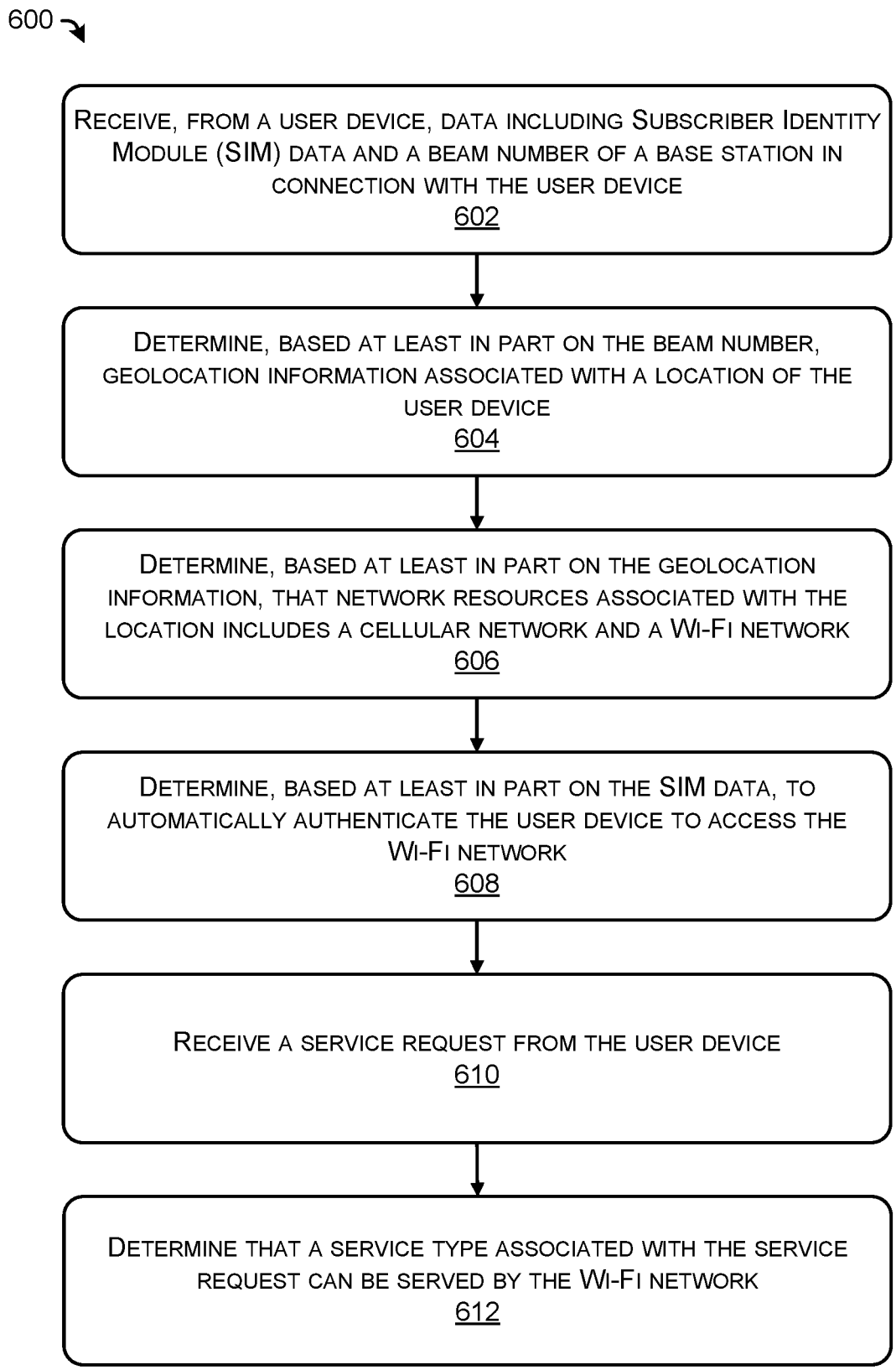
FIG. 6 illustrates another example process for configuring a network to support location-based resource allocation, including Wi-Fi network switch.

FIGS. 5, 6, and 7 illustrate example processes and sequence diagrams in accordance with examples of the disclosure. These processes are illustrated as logical flow graphs, each operation of which represents a sequence of operations that can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular abstract data types. The order in which the operations are described is not intended to be construed as a limitation, and any number of the described operations can be combined in any order, omitted, and/or performed in parallel to implement the processes.

FIG. 5 illustrates an example process 500 for configuring a network to support location-based resource allocation, including automatic authentication for Wi-Fi network access. The example process 500 can be performed by the network device(s) 104 and 106, the user device 200, and/or by the network device 300 comprising the authentication component 306, the location service component 308, the scheduler component 310, the resource database component 312, or another component or device as discussed herein.

At operation 502, the process can include receiving network resource data for one or more Wi-Fi networks associated with a service provider, the network resource data including geofence data and access point data associated a Wi-Fi network the of one or more Wi-Fi networks. As described herein, the system may include receiving and storing network data for one or more Wi-Fi networks within a coverage area of the base station. The network data may include information for each Wi Fi network, including access point locations and/or a geofence for the Wi Fi network. The geofence may be defined by: (1) a predetermined radius from an access point location or (2) a predetermined geographical boundary defining a polygon (e.g., inside a boundary defined by three or more coordinates). For instance, the network data for the first Wi Fi access network 114 may include Wi Fi access information, the geolocations of the network device(s) 106(1)-106(5), and the geofence may be defined by the four geolocation corners of the stadium. In various examples, the location service component 110 may receive data from a user device 102 inside the coverage area of the base station. The data may include SIM data and a beam number of the base station in connection with the user device.

At operation 504, the process can include configuring a Subscriber Identity Module (SIM) card with an enhanced SIM profile, the enhanced SIM profile indicating a user device is configured to self-authenticate for location-based services of the service provider. As described herein, the system may include configuring a SIM card with an enhanced SIM profile to indicate that an associated user device is configured to automatically self-authenticate and/or enable location-based services associated with the service provider.

At operation 506, the process can include receiving, from the user device, data including the enhanced SIM profile and a beam number of a base station in connection with the user device. As described herein, the system may include receiving data from the user device that has entered into the coverage area of the base station. The system may receive data for requesting access to the network and/or data for maintaining a connection to the network. If not yet authenticated, the system may authenticate a user device to access the cellular network of the base station. In some examples, the system may determine whether the data includes SIM data indicating an enhanced SIM profile. If the SIM data indicates an enhanced SIM profile, the system may determine which location-based resource is available to the user device. The system may determine an allocation for the resources available between all the currently connected user devices. Additionally, based at least in part on the enhanced SIM profile, the system may determine to automatically authenticate the user device to access a new Wi Fi network.

At operation 508, the process can include determining, based at least in part on the beam number, geolocation information associated with a location of the user device. As described herein, the system may include using the beam number to determine beam data, including location data of the base station, a beam direction, a beam tilt, a beam power, a beam frequency band, and the like. The system may apply any beam allocation algorithm with the beam data as input to determine the geolocation information. The system may use the geolocation information to determine the available location-based services include a cellular network and a Wi-Fi network.

At operation 510, the process can include determining, based at least in part on the geolocation information and the network resource data, that network resources associated with the location includes a cellular network and the Wi-Fi network. As described herein, the system may use the geolocation information to determine the available location-based services include a cellular network and a Wi-Fi network.

At operation 512, the process can include determining, based at least in part on the enhanced SIM profile, to authenticate the user device to access the Wi-Fi network. As described herein, the system may include determining whether the data includes SIM data indicating an enhanced SIM profile. If the SIM data indicates an enhanced SIM profile, the system may determine which location-based resource is available to the user device. The system may determine an allocation for the resources available between all the currently connected user devices. Additionally, based at least in part on the enhanced SIM profile, the system may determine to automatically authenticate the user device to access a new Wi Fi network.

FIG. 6 illustrates another example process 600 for configuring a network to support location-based resource allocation, including Wi-Fi network switch. The example process 600 can be performed by the network device(s) 104 and 106, the user device 200, and/or by the network device 300 comprising the authentication component 306, the location service component 308, the scheduler component 310, the resource database component 312, or another component or device as discussed herein.

At operation 602, the process can include receiving, from a user device, data including subscriber identity module (SIM) data and a beam number of a base station in connection with the user device. As described herein, the system may include receiving data from the user device that has entered into the coverage area of the base station. The system may receive data for requesting access to the network and/or data for maintaining a connection to the network. If not yet authenticated, the system may authenticate the user device for access to the cellular network of the base station. The system may receive data, including SIM data and a beam number of the base station in connection with the user device.

At operation 604, the process can include determining, based at least in part on the beam number, geolocation information associated with a location of the user device. As described herein, the system may include using the beam number to determine beam data, including location data of the base station, a beam direction, a beam tilt, a beam power, a beam frequency band, and the like. The system may apply any beam allocation algorithm with the beam data as input to determine the geolocation information. The system may use the geolocation information to determine the available location-based services include a cellular network and a Wi-Fi network.

At operation 606, the process can include determining, based at least in part on the geolocation information, that network resources associated with the location include a cellular network and a Wi-Fi network. As described herein, the system may use the geolocation information to determine the available location-based services include a cellular network and a Wi-Fi network.

At operation 608, the process can include determining, based at least in part on the SIM data, to automatically authenticate the user device to access the Wi-Fi network. As described herein, the system may include determining whether the data includes SIM data indicating an enhanced SIM profile. If the SIM data indicates an enhanced SIM profile, the system may determine which location-based resource is available to the user device and determine the resource allocation. Additionally, based at least in part on the enhanced SIM profile, the system may determine to automatically authenticate the user device to access the Wi-Fi network.

At operation 610, the process can include receiving a service request from the user device. As described herein, the system may include a prioritization scheme based on one or more of high-security network, preferred partner network, and user home network. Additionally, the prioritization scheme may include prioritizing Wi-Fi connection use over the cellular connection unless the system receives a service request for a specific service type that requires cellular connection from the user device. The service types may include but is not limited to, an emergency service call, a call to another user device, internet access, email access, data transfer, and the like. In additional examples, the system may determine to generate a security token for a Wi-Fi connection for secured data transfer and/or high security network. The system may cause a communication client on the user device to download application data and/or stream data on the user device.

At operation 612, the process can include determining that a service type associated with the service request can be served by the Wi-Fi network. As described herein, the system may include a prioritization scheme that may determine the network selection based on prioritizing a high-security network, a preferred partner network, and/or a user home network. Additionally, the prioritization scheme may include prioritizing Wi-Fi connection use over the cellular connection unless it receives a service request for a specific service type that requires a cellular connection from the user device. The service types may include but are not limited to: an emergency service call, a voice call to a terminating user device, internet access, email access, data transfer, and the like. In some examples, a particular service type (e.g., emergency service call) may only be served by the cellular network, and in response, the system may determine to switch the network, if not already connected, to the cellular network. In an alternative and/or additional examples, the particular service type (e.g., internet access, email access, data transfer) can be served by the Wi-Fi network and/or the cellular network, and in response, the system may determine to switch the network, if not already connected, to the Wi-Fi network. In some examples, the system may generate security tokens for Wi-Fi connections for secured data transfer and/or high-security networks.

FIG. 7 illustrates another example process 700 for configuring a network to support automatic authentication for a location-based application. The example process 700 can be performed by the network device(s) 104 and 106, the user device 200, and/or by the network device 300 comprising the authentication component 306, the location service component 308, the scheduler component 310, the resource database component 312, or another component or device as discussed herein.

At operation 702, the process can include receiving, from a user device, first data including an enhanced subscriber identity module (SIM) profile and a beam number of a base station in connection with the user device. As described herein, the system may include receiving data from the user device that has entered into the coverage area of the base station. The system may receive data for requesting access to the network and/or data for maintaining a connection to the network. If not yet authenticated, the system may authenticate the user device for access to the cellular network of the base station. The system may receive data, including SIM data and a beam number of the base station in connection with the user device.

At operation 704, the process can include determining, based at least in part on the beam number, geolocation information associated with a location of the user device. As described herein, the system may include using the beam number to determine beam data, including location data of the base station, a beam direction, a beam tilt, a beam power, a beam frequency band, and the like. The system may apply any beam allocation algorithm with the beam data as input to determine the geolocation information. The system may use the geolocation information to determine the available location-based services include a cellular network and a Wi-Fi network.

At operation 706, the process can include determining, based at least in part on the geolocation information and the enhanced SIM profile, to automatically authenticate the user device to use a Wi-Fi network. As described herein, the system may use the geolocation information to determine the available location-based services include a cellular network and a Wi-Fi network. The system may determine whether the data includes SIM data indicating an enhanced SIM profile. If the SIM data indicates an enhanced SIM profile, the system may determine which location-based resource is available to the user device. The system may determine an allocation for the resources available between all the currently connected user devices. Additionally, based at least in part on the enhanced SIM profile, the system may determine to automatically authenticate the user device to access a new Wi-Fi network.

At operation 708, the process can include determining, based at least in part on the geolocation information, a network service associated with the location, the network service including a location-based application. As described herein, the system may include maintaining a resource database with associated location-based resource data. The system can collect data associated with network information, location-based applications, location-based application data, and the like. In various examples, the system may utilize a common data repository, a shared database providing support for 2G/3G/4G/5G core, to store shared location-based resource data, including associated Wi-Fi information. The system may collect and store location-based resource data specific to a particular location and/or associated with a particular Wi-Fi network. As described herein, the system may configure the Wi-Fi node to transmit specific location-based resource data according to a network schedule. The system may store and recall the specific location-based resource data as needed according to the network schedule. Based on the geolocation information, the system may determine a network service associated with the location, the network service including a location-based application.

At operation 710, the process can include transmitting, to the user device via the Wi-Fi network, second data associated with the location-based application. As described herein, the system may include determining, based on the geolocation information, a network service associated with the location, the network service including a location-based application. The system may call a resource database component and may transmit, to the user device via the Wi-Fi network, data associated with the location-based application.

CONCLUSION

Although features and/or methodological acts are described above, it is to be understood that the appended claims are not necessarily limited to those features or acts. Rather, the features and acts described above are disclosed as example forms of implementing the claims.

What is claimed is:

1. A system comprising:
one or more processors;
a memory; and
one or more components stored in the memory and executable by the one or more processors to perform operations comprising:
receiving network resource data associated with one or more Wi-Fi networks affiliated with a service provider, the network resource data including a geofence and access point information associated with a Wi-Fi network of the one or more Wi-Fi networks;
configuring a Subscriber Identity Module (SIM) card associated with a user device to enable an enhanced SIM profile, the enhanced SIM profile indicating the user device is configured to automatically enable location-based services associated with the service provider;
receiving, from the user device, data including SIM data and a beam number of a base station in connection with the user device;
determining, based at least in part on the beam number, geolocation information associated with a location of the user device;
determining, based at least in part on the geolocation information and the network resource data, network resources associated with the location;
determining that the network resources include a cellular network and the Wi-Fi network;
determining, based at least in part on the geolocation information, that the user device is within the geofence; and
determining, based at least in part on the enhanced SIM profile, to automatically authenticate the user device to access the Wi-Fi network.

2. The system of claim 1, wherein determining the geolocation information comprises:
determining, based at least in part on the beam number, beam data including location data of the base station, a beam direction, a beam tilt, and a beam power; and
determining the geolocation information based at least in part on the beam data.

3. The system of claim 1, wherein the operations further comprise:
receiving, from the user device, a service request;
determining a service type associated with the service request; and
determining, based at least in part on the service type, a network of the network resources to serve the service request.

4. The system of claim 3, wherein the service type includes at least one of an emergency service call, a call to another user device, internet access, email access, or data transfer.

5. The system of claim 4, wherein the operations further comprise:
determining that the service type can be served by the Wi-Fi network; and determining to transfer the connection with the user device to the Wi-Fi network.

6. The system of claim 4, wherein the operations further comprise:
determining, based at least in part on the service type, to generate a security token for the connection.

7. A method comprising:
receiving, from a user device, data including Subscriber Identity Module (SIM) data and a beam number of a base station in connection with the user device;
determining, based at least in part on the SIM data, the user device is associated with an enhanced SIM profile, the enhanced SIM profile indicating the user device is configured to self-authenticate for location-based services;
determining, based at least in part on the beam number, geolocation information associated with a location of the user device;
determining, based at least in part on the geolocation information, network resources associated with the location;
determining the network resources includes a cellular network and a Wi-Fi network; and
determining, based at least in part on the enhanced SIM profile, to authenticate the user device to access the Wi-Fi network.

8. The method of claim 7, wherein the data further comprises signal data including at least one of:
Channel Quality Information (CQI) data;
signal-to-noise ratio (SNR) data;
signal-to-interference plus noise ratio (SINR) data; or
signal-to-noise plus distortion ratio (SNDR) data.

9. The method of claim 8, wherein the data further comprises previously accessed Wi-Fi network data and further comprises:
determining, based at least in part on the previously accessed Wi-Fi network data, the network resources further includes a second Wi-Fi network; and
determining to poll the second Wi-Fi network for network capabilities.

10. The method of claim 9, further comprising:
determining, based at least in part on the signal data and the poll, to authenticate the user device to use the second Wi-Fi network.

11. The method of claim 7, further comprising:
receiving, from the user device, a service request;
determining a service type associated with the service request;
determining that the service type associated with the service request can be served by the Wi-Fi network; and
determining to transfer the connection with the user device to the Wi-Fi network.

12. The method of claim 11, further comprising:
receiving, from the user device, a second service request;
determining a second service type associated with the second service request can only be served by the cellular network; and
determining to transfer the connection with the user device to the cellular network.

13. The method of claim 11, wherein transferring the connection to the Wi-Fi network further comprises:
determining the Wi-Fi network satisfies one or more network criteria, the one or more network criteria includes at least one of meeting quality of service threshold or an association with the enhanced SIM profile.

14. The method of claim 7, further comprising:
determining, based at least in part on the geolocation information, a location-based application associated with the location is available; and
transmitting, to the user device and based at least in part on the access to the Wi-Fi network, second data associated with the location-based application.

15. The method of claim 14, wherein the location-based application is a multimedia application and further comprising:
causing the multimedia application to execute on the user device; and
transmitting a command to display a multimedia presentation on the user device.

16. The method of claim 14, wherein the location-based application is a classified application and further comprising:
determining, based at least in part on the geolocation information and the enhanced SIM profile, to authenticate a user account associated with the user device to access the classified application.

17. One or more non-transitory computer-readable media storing computer executable instructions that, when executed, cause one or more processors to perform operations comprising:
configuring a base station to schedule network resources with one or more Wi-Fi networks within a coverage area associated with the base station, the base station and the one or more Wi-Fi networks are associated with a service provider;
receiving network resource data associated with the one or more Wi-Fi networks, the network resource data including geofencing information and access information associated with the one or more Wi-Fi networks;
configuring a Subscriber Identity Module (SIM) card associated with a user device to enable an enhanced SIM profile, the enhanced SIM profile indicating the user device is configured to self-authenticate location-based services associated with the service provider;
receiving, from the user device, data including SIM data and a beam number of the base station in connection with the user device;
determining, based at least in part on the beam number, geolocation information associated with a location of the user device;
determining, based at least in part on the geolocation information and the geofencing information, that network resources associated with the location includes a cellular network and the one or more Wi-Fi networks; and
determining, based at least in part on one or more network criteria, a Wi-Fi network of the one or more Wi-Fi networks to authenticate the user device to access.

18. The one or more non-transitory computer-readable media of claim 17, wherein the one or more network criteria comprises at least one of a meeting quality of service threshold, an association of a device with the enhanced SIM profile, or a meeting a network selection rule.

19. The one or more non-transitory computer-readable media of claim 18, wherein the network selection rule includes a selection priority based on at least one of a user preferred network, an associated user network privilege, associated network quality, or an affiliation with the service provider.

20. The one or more non-transitory computer-readable media of claim 17, wherein the geofencing information includes geographical location data indicating geographical boundaries of a network access area associated with the Wi-Fi network.

\* \* \* \* \*